US010052662B2

(12) United States Patent
Harrer

(10) Patent No.: US 10,052,662 B2
(45) Date of Patent: Aug. 21, 2018

(54) SORTING DEVICE WITH ADJACENT TERMINALS

(71) Applicant: BEUMER GmbH & Co. KG, Beckum (DE)

(72) Inventor: Stefan Harrer, Gütersloh (DE)

(73) Assignee: BEUMER GmbH & Co. KG, Beckum (DE)

( * ) Notice: Subject to any disclaimer, the term of this patent is extended or adjusted under 35 U.S.C. 154(b) by 6 days.

(21) Appl. No.: 15/385,065

(22) Filed: Dec. 20, 2016

(65) Prior Publication Data

US 2017/0239688 A1 Aug. 24, 2017

(30) Foreign Application Priority Data

Feb. 18, 2016 (EP) .................................... 16000404

(51) Int. Cl.
*B65G 47/00* (2006.01)
*B07C 5/36* (2006.01)
*B07C 3/08* (2006.01)

(52) U.S. Cl.
CPC .............. *B07C 5/362* (2013.01); *B07C 3/082* (2013.01)

(58) Field of Classification Search
CPC ..................................................... B65G 47/00
USPC ................................................. 198/904, 954
See application file for complete search history.

(56) References Cited

U.S. PATENT DOCUMENTS

| | | | | |
|---|---|---|---|---|
| 6,736,254 B1 * | 5/2004 | Fortenbery | .......... | B65G 47/962 198/370.03 |
| 7,950,182 B2 * | 5/2011 | Erhart | .................... | A01D 45/00 47/58.1 R |
| 2017/0241892 A1 * | 8/2017 | Brubacher | ......... | G01N 15/1429 |

* cited by examiner

*Primary Examiner* — Gene O Crawford
*Assistant Examiner* — Lester III Rushin
(74) *Attorney, Agent, or Firm* — Renner, Otto, Boisselle & Sklar, LLP

(57) ABSTRACT

Sorting device comprising several sorting carts, which can be moved along a sorting track in a transport direction and in each case are provided with a load receiving device for controlled receipt and delivery of individually packaged goods, with a quantity of discharge points at which individually packaged goods can be specifically delivered according to a respective sorting destination from the sorting carts, wherein each discharge point has a width, wherein the width of at least some discharge points can be adjusted while the sorting device is operating, and method for sorting individually packaged goods using the device.

16 Claims, 4 Drawing Sheets a: t1:

b: t2:

c: t3:

SORTING DEVICE WITH ADJACENT TERMINALS

The present application is related to and claims priority under 35 U.S.C. § 119 to European Application No. 16 000 404.0, filed 18 Feb. 2016, the entirety of which is hereby incorporated herein by reference.

TECHNICAL FIELD

The present invention relates to a sorting device with sorting carts and adjacent terminals.

SUMMARY

The invention relates to a sorting device with sorting carts, which in each case can be moved along a sorting track in a transport direction and are each provided with a load receiving device for controlled receipt and delivery of individually packaged goods, with a quantity of discharge points, whereby each discharge point seen in the transport direction has a certain width and at each discharge point individually packaged goods can be specifically delivered from the sorting carts corresponding to a respective sorting destination.

The sorting carts normally comprise a tilt tray or a transverse belt conveyor as load receiving device, so that a received individually packaged item can be delivered at a discharge point diagonally to the transport direction. For a number of sorting destinations a corresponding quantity of discharge points is necessary, whereby each discharge point must have sufficient width, so that a larger individually packaged item can also be received without difficulty. The total width of a discharging area resulting from a greater quantity of discharge points with a certain width is frequently problematic, since sufficient space is not always available. Every effort therefore is made to keep the width of the discharging area to a minimum, for which reason it is expedient to keep the width of the discharge points as small as possible. This results in a quantity of discharge points which meets the need in respect to time and thus in an increased throughput.

According to the invention it is proposed that the width of at least one discharge point can be adjusted while the sorting device is operating and in particular can be adapted to a length of an individually packaged item to be delivered. Namely it has been recognized that adapting the width of the discharge points to the individually packaged goods to be handed over at these discharge points means that the discharging area does not become too large overall, or that the necessary quantity of discharge points can be accommodated within a smaller total width than up till now.

Preferably it is proposed that the at least one discharge point can be adjusted steplessly or in predefined stages.

At least one discharge point can comprise a receptacle with adjustable width. Alternatively or additionally it may be proposed that at least one discharge point has a chute with adjustable width. The chute can taper or expand depending on width setting in a delivery direction guided by the sorting track.

In a preferred refinement of the invention it is proposed that the quantity of discharge points is adjustable while the sorting device is operating, whereby additional discharge points can be added or existing discharge points can be removed depending on sorting destination need.

Expediently the width of a discharge point is adjusted at least as large as a length, seen in the transport direction, of an individually packaged item to be delivered.

Discharge points with different widths, adapted to the expected length of individually packaged goods to be delivered, can be installed.

Two adjacent discharge points can be separated from one another by a movable partition and in each case comprise a further lateral enclosure, whereby the partition can be moved between the lateral enclosures, in order to change the width of the discharge points or to remove one of the two discharge points.

Discharge points are understood to mean any devices, in which individually packaged goods which are discharged from a sorting device, can be received. For example a discharge point can be formed as chute, receptacle, roller track or regular conveyor system such as belt conveyor. A bag is understood to mean a special form of receptacle. Only one type of discharge point or however several different types of discharge point can be assigned to a sorting device.

As far as a discharge point has a receptacle, this can be in the form of a flexible bag, held on carriers which can be re-arranged in the transport direction for adjusting the width.

It may be proposed that the discharge points are located next to one another without gaps within the discharging area in each adjustment position, or however that the discharge points are arranged in several groups consisting of adjacent discharge points, whereby sections, in which no discharge points are located, exist between the groups. Alternatively certain distance could be provided between two adjacent discharge points.

Expediently a central or decentralized controller is proposed, which receives position information of the sorting carts and can be triggered with the one load receiving device of a selected sorting cart for delivering an individually packaged item, located on it, at a selected discharge point. The delivery operation can be initiated based on position information of the sorting cart, with the position of a selected sorting cart at the location of the selected discharge point being recorded. For example a sensor can be stationarily located in the vicinity of the discharge point, so that a sorting cart running past can be detected and the delivery operation initiated. Alternatively the position of at least one sorting cart can be detected, or the sorting carts communicate their position independently. The position of the remaining sorting carts is calculated accordingly. If the position of all sorting carts is detected, no calculation takes place. The delivery operation is carried out on the basis of this preceding position calculation. In this case the arrival of the sorting cart at the discharge point does not need to be detected by sensor, which especially with variable discharge points constitutes a major advantage.

Preferably it is proposed that the controller receives size information, in particular length information of the individually packaged goods, for example by means of an input, a length recording or from a database, and a specific discharge point for the delivery can be deliberately selected by the controller on the basis of the length information or the width of a selected discharge point can be adapted to the length of a certain individually packaged item. In particular an especially long individually packaged item, occupying two or more load receiving devices, can be delivered at a selected discharge point with sufficient width, or the width of a selected discharge point can be adapted to receive such an individually packaged item.

The width of the discharge point does not only depend on the length of the individually packaged goods to be delivered, but can also depend on the planned number and/or the surface area or the volume of the individually packaged goods.

It may be further proposed that a length of at least one discharge point can be adjusted while the sorting device is operating, whereby the length is preferably set by the central controller. In the case of the length being varied the distance between a discharge point and the sorting track is reduced or increased.

The invention also relates to a method for sorting individually packaged goods, using a sorting device according to the invention, whereby a sorting destination in the form of a specific discharge point is assigned to each individually packaged item and the width of at least one discharge point is changed while the sorting device is operating. It may be proposed that a length of a certain individually packaged item is recorded, entered manually or automatically or taken from a database and that a width of a specific discharge point is adapted to the length.

Furthermore it may be proposed that a certain quantity of discharge points is set while the sorting device is operating. For this purpose additional discharge points can be provided or existing discharge points can be removed depending on sorting destination need.

Preferably the invention proposes that a delivery point in time of a certain individually packaged item at a specific discharge point is determined from position information of the sorting cart transporting the individually packaged item.

BRIEF DESCRIPTION OF THE DRAWINGS

The invention is described below on the basis of exemplary embodiments, whereby reference is made to a drawing wherein.

DETAILED DESCRIPTION

Figure 1:
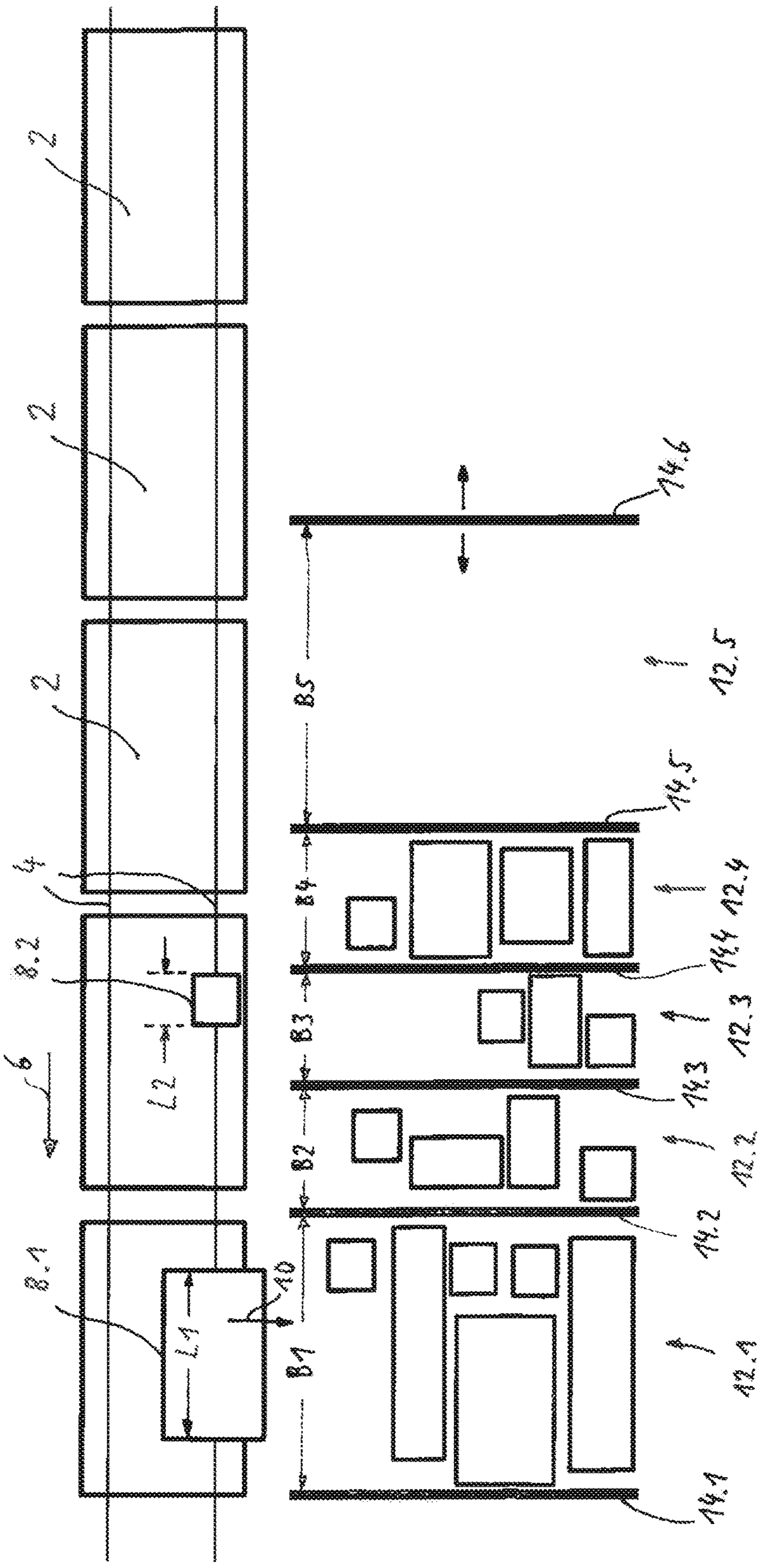
FIG. 1 shows a first embodiment of a sorting device according to the invention, in which a series of discharge points are formed by movable partitions.

FIG. 1 shows a schematic plan view onto a sorting device with a series of sorting carts 2 coupled to one another, which can be moved along a sorting track 4 in a transport direction 6. Each sorting cart is provided with a load receiving device for controlled receipt and delivery of individually packaged goods, whereby the foremost sorting carts 2.1, 2.2 in FIG. 1, seen in the transport direction 6, are filled with varyingly large individually packaged goods 8.1, 8.2. A major dimension of each individually packaged item here is its length, seen in the transport direction 6, which in FIG. 1 is designated with L1 for the individually packaged item 8.1 and L2 for the individually packaged item 8.2.

The load receiving devices of the sorting carts 2 can be formed as tilt trays which can be pivoted diagonally to the transport direction 6 or as transverse belt conveyors which can be moved diagonally to the transport direction, so that with corresponding control of the load receiving device a movement component diagonally to the transport direction 6 can be given to a selected individually packaged item on a selected sorting cart 2, whereupon the individually packaged item can be handed over toward the arrows 10 to a selected discharge point 12.1, 12.2, 12.3, 12.4, 12.5. FIG. 1 illustrates a situation, in which the individually packaged item 8.1 is delivered to the discharge point 12.1 and the individually packaged item 8.2 to the discharge point 12.3.

Each discharge point 12.1 . . . 12.5 represents a sorting destination for individually packaged goods to be sorted and can be constructed differently. A discharge point for example can comprise a chute, roller track or regular conveyor system such as belt conveyor, whereby a downstream sorting machine or only a receiving receptacle can be arranged at the other end of the chute or conveyor system.

Alternatively a discharge point can be formed only by a receptacle, which serves to receive individually packaged goods.

Each discharge point 12.1 . . . 12.5 has a width a B1 . . . B5, i.e. a dimension seen in the transport direction 6, whereby at least one discharge point is adjustable in respect to its width while the sorting device is in operation. FIG. 1 describes this on the basis of partitions 14.1, 14.2, . . . to 14.6, whereby in each case a discharge point is arranged between two directly adjacent partitions 14.1, 14.2; 14.2, 14.3 etc. or is formed by these. The width adjustability of the discharge point 12.5 is described on the basis of the partition 14.6, whereby the partition 14.6, which is perpendicular to the transport direction 6, can be moved in a controlled fashion toward the transport direction 6, so that a certain width B5 of the discharge point 12.5 can be adjusted.

For example the adjustable partitions 14.1 . . . 14.6 can include a sloping chute surface, above which the partitions are adjustable, so that between adjacent partitions varyingly wide discharge points result in the form of chutes.

In particular each individual partition 14.1 . . . 14.6 can be moved in the transport direction 6, so that the width of each discharge point is adjustable.

The adjustment of the width to the discharge points, here the re-arrangement of the individual partitions, takes place via a central controller, which also receives position information of the sorting carts and can be triggered with the one load receiving device of a selected sorting cart 2 for delivery of an individually packaged item, located on it, at a selected discharge point. A special advantage lies in the fact that the width of the discharge point, to which a certain individually packaged item is to be delivered, can be adapted to the length L1, L2 of the individually packaged item 8.1, 8.2 concerned, directly before delivery. Furthermore the width of the discharge point can be adapted to the number, the volume or a surface area of the individually packaged goods to be delivered at this discharge point.

The width of the individual discharge points cannot only be changed, but also their quantity can be increased or reduced while the sorting device is operating, with discharge points either being removed or added. An exemplary solution for this lies in the fact that one or more additional partitions are brought from a resting position, in which the respective partition is arranged remotely from the sorting track, into an operating position, in which they form one or more additional discharge points jointly or in combination with existing partitions forming discharge points. A movement from the resting position into the operating position can take place either in a straight line diagonally to the transport direction 6, or however in the form of a pivot movement around a horizontal axis, whereby the partition can be arranged in the resting position parallel or obliquely to the transport direction 6 and in the operating position diagonally to the transport direction 6.

Irrespective of a specific embodiment the partitions do not inevitably have to be arranged diagonally to the transport direction 6. In other words a longitudinal direction of the discharge points, which runs parallel to the partitions, can be arranged diagonally or at an obtuse angle to the transport direction 6, for example between 120° and 60°. Whenever a discharge point is located between two partitions, which do not run parallel to each other, converging or diverging seen from the sorting track 4, a longitudinal direction of the discharge points would bisect these adjacent partitions.

Figure 2:
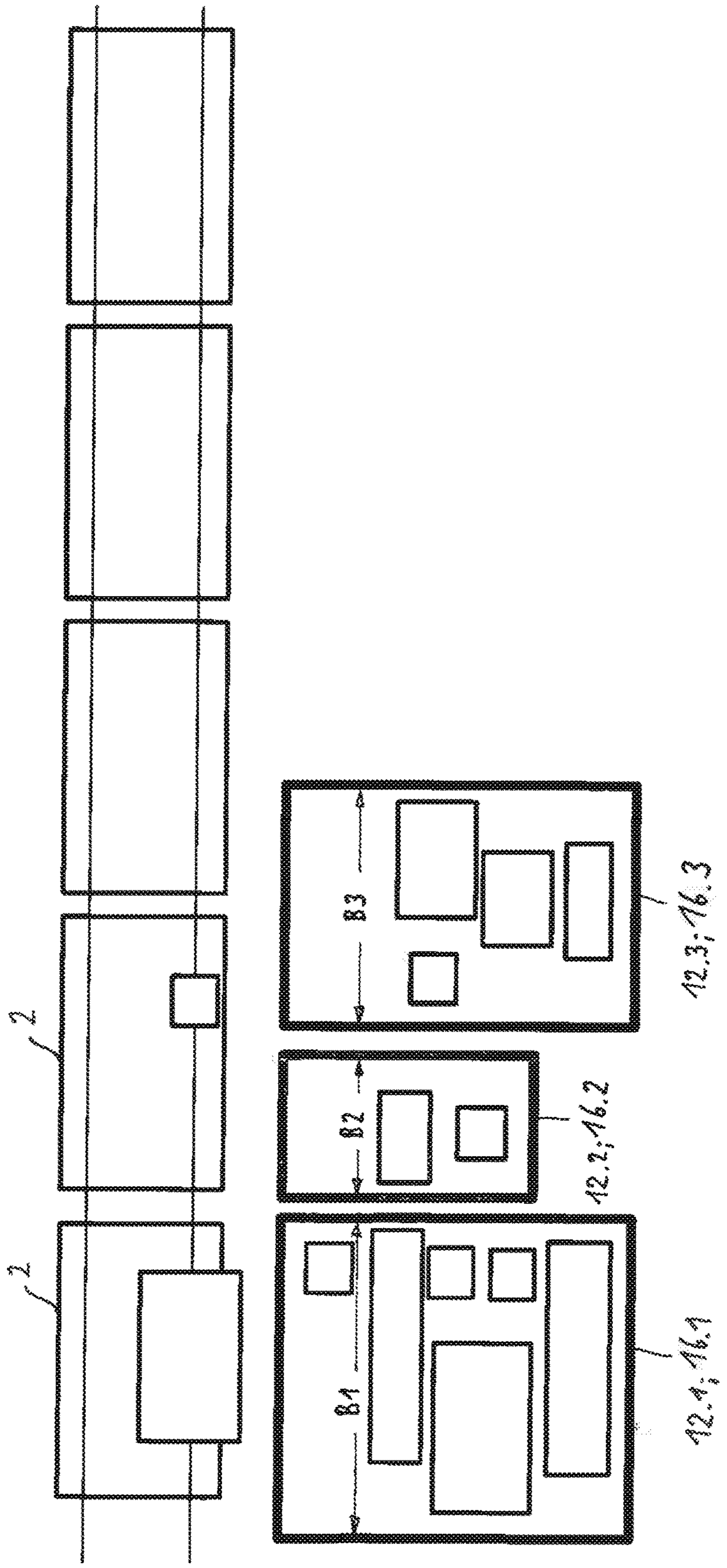
FIG. 2 shows a second embodiment, in which discharge points of different width are formed by receiving receptacles of variable width.
Figure 3:
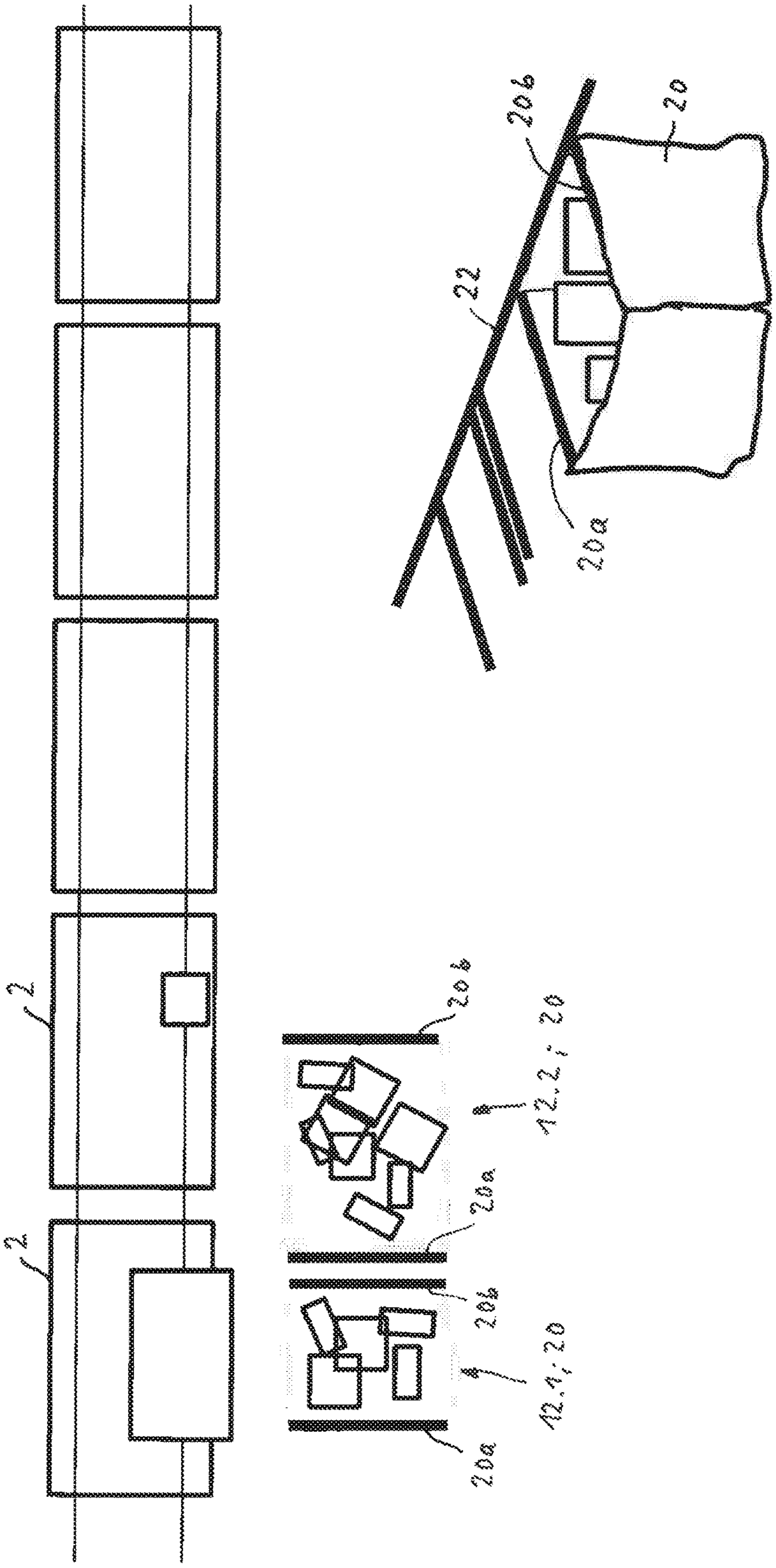
FIG. 3 shows a variant of the second embodiment, in which the receptacles are formed by flexible bags, and FIGS. 4*a* to *c*, in a schematic plan view onto a discharge point arrangement of a sorting device in each case, show the possible temporal progression of positions and widths of discharge points at three consecutive points in time t1 to t3.

FIG. 2 shows an embodiment, in which discharge points of different width are formed by receiving receptacles 16.1, 16.2, 16.3 of different width B1, B2, B3, whereby the width of the receptacles can be adjusted or varied, depending on need while the sorting device is operating. The receiving receptacles 16.1 . . . 16.3 for example can be formed from flexible cardboard, the width of which can be altered. FIG. 3 by way of example shows three different widths of the receiving receptacles, whereby the ratio of the size between largest and smallest width is approx. 3. In practice the width can be reduced and increased naturally so far that it corresponds to the smallest and largest length of the individually packaged goods to be sorted, or in accordance with the volume or the surface area of the individually packaged goods. Furthermore full receptacles or those no longer needed can be taken away. They can either be replaced or their place remains free.

FIG. 3 shows a variant of the embodiment in accordance with FIG. 2, whereby flexible receiving receptacles 20 are formed from flexible bags, pouches or similar receptacles with flexible side panels. Each receiving receptacle or bag 20 is held on a pair of carriers 20*a*, 20*b* adjustable in the transport direction 6, so that an enlargement or reduction in the width of the receiving receptacle or bag 20 can be achieved by re-arranging one or both carriers 20*a*, 20*b*. In accordance with FIG. 3 the carriers 20*a*, 20*b* of each receiving receptacle 20 are guided displaceably on a guide rail 22 running parallel to the transport direction 6 and provided with suitable actuation equipment for re-arrangement in the transport direction 6.

Among the embodiments described a—not illustrated—controller is proposed, which receives position information of the sorting carts and can be triggered with the one load receiving device of a selected sorting cart for delivery of an individually packaged item, located on it, at a selected discharge point. The width of a respective discharge point is known to the central or decentralized controller and/or also adjustable by this, wherein for example the re-arrangement of the partitions 14.1 . . . 14.6, the width adjustment of the receiving receptacles 16.1 . . . 16.3 or the movement of the carriers 20*a*, 20*b* is implemented for adjusting the width of a bag 20 by the central controller, coordinated with the movement of the sorting carts and the delivery of individually packaged goods. Furthermore it would be conceivable for the width of a discharge point to be changed manually by an operator.

Figure 4:
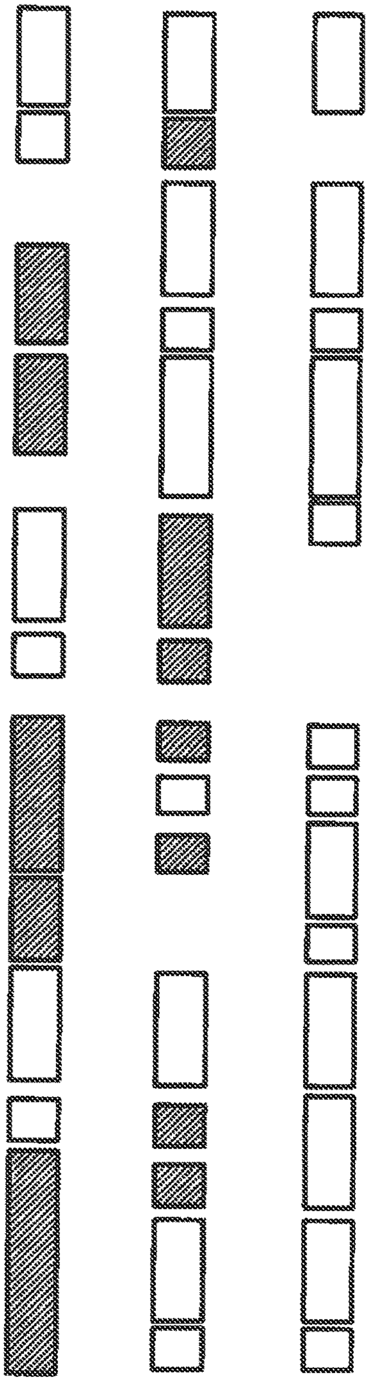

FIGS. 4*a*, 4*b* and 4*c* show three schematic plan views in each case onto a discharge point arrangement of a sorting device, whereby the individual views show the possible temporal progression of positions and widths of the discharge points at three consecutive times t1 to t3, i.e. FIG. 4*a* shows the discharge point arrangement of the sorting device at one time t1, FIG. 4*b* a possible discharge point arrangement at a later time t2 and FIG. 4*c* a possible discharge point arrangement at a further later time t3.

In the individual illustrations, discharge points which are shown with shading designate such discharge points, which or whose receiving receptacles are filled with received individually packaged goods and either replaced by a specific quantity of empty discharge points or receiving receptacles with a certain width or remain empty, i.e. a discharge point first existing is removed.

The time graph of FIG. 4*a* to FIG. 4*c* shows that individual discharge points remain in existence over a certain time with their width unchanged, while other discharge points are filled in shorter time intervals and replaced afterwards by a discharge point with a different width or removed. As a result a greater quantity of discharge points is made available on the same surface area over time than in the state of the art.

REFERENCE SYMBOL LIST

2 sorting cart
4 sorting track
6 transport direction
8.1, 8.2 individually packaged item
12.1 . . . 12.5 discharge point
14.1 . . . 14.6 partition
16.1 . . . 16.3 receiving receptacle
20 flexible receiving receptacle (bag)
20*a*, 20*b* carrier
22 guide rail
B1 . . . B5 width
L1, L2 length
t1, t2, t3 time

The invention claimed is:

1. Sorting device comprising several sorting carts, which can be moved along a sorting track in a transport direction and in each case are provided with a load receiving device for controlled receipt and delivery of individually packaged goods with a quantity of discharge points, at which individually packaged goods can be specifically delivered according to a respective sorting destination from the sorting carts, wherein each discharge point has a width (B1 . . . B5), characterized in that the width (B1 . . . B5) of at least some discharge points can be adjusted while the sorting device is operating, wherein the quantity of discharge points is adjustable while the sorting device is operating, wherein additional discharge points can be provided or existing discharge points can be removed depending on sorting destination need.

2. Sorting device according to claim 1, characterized in that individually packaged goods can be delivered according to a respective sorting destination by a central or decentralized controller.

3. Sorting device according to claim 1, characterized in that the width of at least one discharge point can be adjusted steplessly.

4. Sorting device according to claim 1, characterized in that at least one discharge point has a receptacle with adjustable width.

5. Sorting device according to claim 1, characterized in that at least one discharge point has a chute with adjustable width.

6. Sorting device according to claim 5, characterized in that the chute tapers or expands depending on the width setting in a delivery direction guided by the sorting device.

7. Sorting device according to claim 1, characterized in that the width (B1 . . . B5) of a discharge point is set at least as large as a length (L1, L2), seen in the transport direction, of an individually packaged item to be delivered.

8. Sorting device according to claim 1, characterized in that several discharge points with different width (B1 . . . B5), adapted to the expected length of individually packaged goods to be delivered, are provided.

9. Sorting device according to claim 1, characterized in that several discharge points with different width, adapted to the expected number, surface area and/or volume of individually packaged goods to be delivered, are installed.

10. Sorting device according to claim 1, characterized in that two adjacent discharge points are separated from one another by a movable partition and in each case comprise a further lateral enclosure, wherein the partition between the lateral enclosures is movable, in order to change the width of the discharge points or to remove one of the two discharge points.

11. Sorting device according to claim 4, characterized in that the receptacle is formed by flexible bags, held on carriers which can be re-arranged in the transport direction.

12. Sorting device according to claim 1, characterized in that a length of at least one discharge point can be specifically adjusted while the sorting device is operating.

13. Method for sorting individually packaged goods, using a sorting device according to claim 1, further comprising assigning a sorting destination in the form of a specific discharge point to each individually packaged item and changing the width (B1 . . . B5) of at least one discharge point while the sorting device is operating.

14. Method according to claim 13, further comprising recording, entering or taking from a database a length (L1, L2) of a certain individually packaged item and adapting a width (B1 . . . B5) of a specific discharge point to the length (L1, L2).

15. Method according to claim 13, further comprising setting a predefinable quantity of discharge points while the sorting device is operating.

16. Method according to claim 13, further comprising determining a delivery point in time of a certain individually packaged item at a specific discharge point from position information of the sorting cart transporting the individually packaged item.

* * * * *